(12) United States Patent
Draganov et al.

(10) Patent No.: US 11,762,692 B2
(45) Date of Patent: *Sep. 19, 2023

(54) POST PROVISIONING OPERATION MANAGEMENT IN CLOUD ENVIRONMENT

(71) Applicant: VMware, Inc., Palo Alto, CA (US)

(72) Inventors: Viktor Draganov, Sofia (BG); Ivanka Baneva, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/347,566

(22) Filed: Jun. 14, 2021

(65) Prior Publication Data
US 2021/0382753 A1     Dec. 9, 2021

Related U.S. Application Data

(63) Continuation of application No. 16/253,201, filed on Jan. 21, 2019, now Pat. No. 11,042,407.

(51) Int. Cl.
| | |
|---|---|
| *G06F 9/50* | (2006.01) |
| *G06F 9/455* | (2018.01) |
| *H04L 29/08* | (2006.01) |
| *H04L 67/10* | (2022.01) |

(52) U.S. Cl.
CPC ............ *G06F 9/50* (2013.01); *G06F 9/45533* (2013.01); *G06F 2209/5011* (2013.01); *H04L 67/10* (2013.01)

(58) Field of Classification Search
CPC ................................ G06F 9/50; G06F 9/45533
USPC ....................................................... 718/1–108
See application file for complete search history.

(56) References Cited

U.S. PATENT DOCUMENTS

| | | | |
|---|---|---|---|
| 9,047,133 B2 | 6/2015 | Winterfeldt et al. | |
| 9,170,798 B2 | 10/2015 | Nagaraja et al. | |
| 10,382,266 B1 * | 8/2019 | Balakrishnan | H04L 67/55 |
| 10,885,007 B2 * | 1/2021 | Bhagwat | G06F 16/2465 |
| 2011/0321033 A1 | 12/2011 | Kelkar et al. | |

(Continued)

OTHER PUBLICATIONS

Fernandez, Hector, Guillaume Pierre, and Thilo Kielmann. "Autoscaling web applications in heterogeneous cloud infrastructures." 2014 IEEE international conference on cloud engineering. IEEE, 2014. pp.195-204 (Year: 2014).*

(Continued)

*Primary Examiner* — Satish Rampuria
(74) *Attorney, Agent, or Firm* — SU IP CONSULTING

(57) ABSTRACT

An example method to manage post provisioning operations of a virtual computing instance in a heterogeneous cloud environment is disclosed. The virtual computing instance may be provisioned by a first management entity and configured to receive a command from a second management entity. The method includes defining the instance with a dynamic type by the first management entity and repeatedly finding the dynamic type with one or more finder workflows to determine whether the virtual computing instance is terminated based on the command from the second management entity. In response to not finding the dynamic type within the heterogeneous cloud environment, the method further includes creating a catalog item for the virtual computing instance in a common service catalog and managing one or more resources allocated for the virtual computing instance based on the created catalog item.

18 Claims, 4 Drawing Sheets

(56) References Cited

U.S. PATENT DOCUMENTS

| | | | | |
|---|---|---|---|---|
| 2013/0232498 | A1* | 9/2013 | Mangtani | G06F 9/5038 718/104 |
| 2013/0238785 | A1* | 9/2013 | Hawk | G06F 9/5077 709/224 |
| 2014/0189703 | A1* | 7/2014 | Gilder | G06F 9/5027 718/104 |
| 2017/0207991 | A1* | 7/2017 | Mercuri | H04L 43/18 |
| 2018/0157384 | A1* | 6/2018 | Baneva | G06F 8/31 |
| 2018/0165090 | A1* | 6/2018 | Raghavan | G06F 9/5077 |
| 2020/0233708 | A1 | 7/2020 | Draganov et al. | |

OTHER PUBLICATIONS

Demchenko, Yuri, et al. "Intercloud architecture framework for heterogeneous cloud based infrastructure services provisioning on-demand." 2013 27th International Conference on Advanced Information Networking and Applications Workshops. IEEE, 2013. pp. 777-784 (Year: 2013).*

Afrin, Mahbuba, et al. "Resource allocation and service provisioning in multi-agent cloud robotics: A comprehensive survey." IEEE Communications Surveys & Tutorials 23.2 (2021): pp. 842-870. (Year: 2021).*

Zhong, Zhiheng, and Rajkumar Buyya. "A cost-efficient container orchestration strategy in kubernetes-based cloud computing infrastructures with heterogeneous resources." ACM Transactions on Internet Technology (TOIT) 20.2 (2020): pp. 1-24. (Year: 2020).*

Crago, Steve, et al. "Heterogeneous cloud computing." 2011 IEEE International Conference on Cluster Computing. IEEE, 2011. pp. 378-385 (Year: 2011).*

Zhang, Qi, et al. "Dynamic heterogeneity-aware resource provisioning in the cloud." IEEE transactions on cloud computing 2.1 (2014): pp. 14-28. (Year: 2014).*

VMware, "Using VMware vRealize Orchestrator Plug-Ins", vRealize Automation 7.5, Sep. 20, 2018.

Mohamed Sellami et al., "PaaS-independent Provisioning and Management of Applications in the Cloud", 2013 IEEE Sixth International Conference on Cloud Computing, 2013, pp. 693-700.

Rajiv Ranjan et al., "Peer-to-peer Service Provisioning in Cloud Computing Environments", The journal of Supercomputing 65, Jan. 2013, pp. 154-184.

Johannes Kirschnick et al., "Toward an Architecture for the Automated Provisioning of Cloud Services", IEEE Communications Magazine 48, Dec. 2010, pp. 124-131.

Zohreh Sanaei et al., "Heterogeneity in Mobile Cloud Computing: Taxonomy and Open Challenges", IEEE Communications Surveys & Tutorials, 1st Quarter 2014, pp. 369-392, vol. 16, No. 1.

Steve Crago et al., "Heterogeneous Cloud Computing", IEEE International Conference on Cluster Computing, 2011, pp. 378-385.

Hector Fernandez et al., "Autoscaling Web Applications in Heterogeneous Cloud Infrastructures", IEEE International Conference on Cloud Engineering, 2014, pp. 195-204.

* cited by examiner

300

```
var strs = Server.findALLForType("VCACTest:SPTString");
resultObjs = new Array();
for each (var str in strs) {
    var resultObj = DynamicTypeManager.makeObject("idf" , type , id , "Object_" + str.name);
        resultObj.setProperty("value", str.value);

resultObj.setProperty("exists", true);

resultObj.push(resultObj);            ← 321
}
```

In (string) type, (string) id
Out (DynamicTypes:idf.MyString) resultObj

//TODO Fill in script content                    401
var str = Server.findForType("VCACTest:SPTString", id);

410→ if (str!=null) {
        resultObj = DynamicTypeManager.makeObject("idf" , type , id , "Object_" + str.name);
        resultObj.setProperty ("value", str.value);
        resultObj.setProperty ("exists", true);
                                            411
420→ } else {
        resultObj = DynamicTypeManager.makeObject("idf" , type , id , "NOT FOUND");
        resultObj.setProperty ("exists", false);
    }                                       421
```

FIGURE 4

POST PROVISIONING OPERATION MANAGEMENT IN CLOUD ENVIRONMENT

CROSS-REFERENCE TO RELATED APPLICATION

The present application is a continuation under 35 U.S.C. § 120 of U.S. patent application Ser. No. 16/253,201, filed on Jan. 21, 2019, and entitled "POST PROVISIONING OPERATION MANAGEMENT IN CLOUD ENVIRONMENT," and now U.S. patent Ser. No. 11,042,407 which is incorporated herein by reference in its entirety.

BACKGROUND

A cloud automation product may be used to perform cloud management operations on a cloud system including multiple deployment environments, each having one or more deployment endpoints (endpoints). The cloud automation product may provide a portal where authorized administrators, developers or business users may request various IT services and manage specific cloud and IT resources in compliance with business policies. Requests for such IT services, including infrastructure, applications, desktops, and many others, are processed through a common service catalog. Users can browse the common service catalog to request catalog items they need.

An architect may create a blueprint and publish it as a catalog item in the common service catalog. The blueprint may define how to provision and manage the lifecycle of resources in the cloud. Each blueprint includes unique topology. One or more blueprints may form a specification which describes how a virtual machine or an application is deployed in the cloud.

For example, with Extensibility as a Service (XaaS), an XaaS architect may create XaaS blueprints and publish them as one or more catalog items in the common service catalog. An XaaS blueprint is a complete specification of a resource. With XaaS blueprints, predefined and custom workflows can be published as catalog items for provisioning, requesting, or offering actions to manage resources in the cloud.

Typically, components from various vendors are included in a heterogeneous cloud environment. A virtual computing instance (e.g., a virtual machine, containers, or the like) in the heterogeneous cloud environment may be provisioned by a first cloud management server of a first vendor but terminated by a second cloud management server of a second vendor. The first cloud management server allocates resources to provision the virtual computing instance. However, the first cloud management server is not aware of the user has been terminated the virtual computing instance through the second cloud management server, resulting the allocated resources are still reserved for the terminated virtual computing instance.

BRIEF DESCRIPTION OF THE DRAWINGS

FIG. 3 illustrates a scripting example associated with defining an object in a heterogeneous cloud environment, according to one or more embodiments of the present disclosure.

FIG. 4 illustrates a scripting example associated with finder workflows, according to one or more embodiments of the present disclosure.

DETAILED DESCRIPTION

Figure 1:
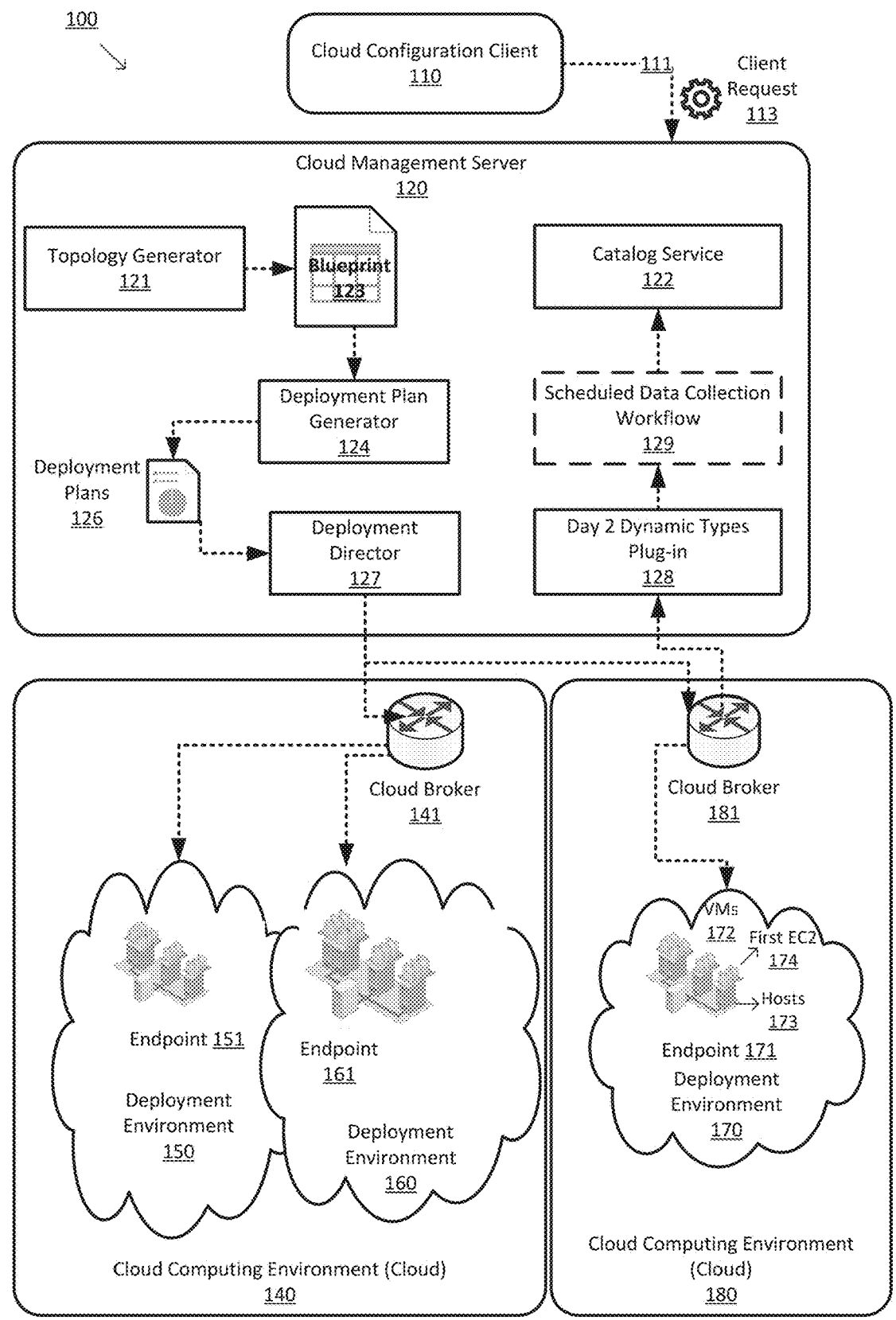
FIG. 1 illustrates a block diagram of a system to manage post provisioning operations in a heterogeneous cloud environment, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of example system 100 configured to manage post provisioning operations in a heterogeneous cloud environment, according to one or more embodiments of the present disclosure. In FIG. 1, system 100 may include cloud configuration client 110, cloud management server 120, and cloud computing environments 140 and 180 (or "cloud 140" and "cloud 180"). In some embodiments, cloud configuration client 110, cloud management server 120, and cloud computing environment 140 may form a homogeneous cloud whose entire software stack is provided by one single vendor. On the contrary, cloud configuration client 110, cloud management server 120, and cloud computing environment 180 may form a heterogeneous cloud whose software stacks are provided by different vendors.

Cloud management server 120 may be configured to manage cloud computing environments 140 and 180, as well as one or more deployment environments 150, 160, and 170 contained therein. Cloud management server 120, which may be accessed by one or more cloud configuration clients 110, may include, among other hardware/software modules and components, topology generator 121, deployment plan generator 124, and deployment director 127. Specifically, cloud management server 120 may be configured to deploy one or more virtual machines and/or virtual computing instances in any of deployment environments 150 or 160 of cloud 140, and deployment environment 170 of cloud 180.

In some embodiments, cloud configuration client 110 may be installed on a client computer (e.g., a personal computer or workstation) to communicate with cloud management server 120 to access and manage cloud 140 and/or cloud 180. Cloud configuration client 110 may interact with cloud management server 120 via Transmission Control Protocol/Internet Protocol (TCP/IP), Hypertext Transfer Protocol (HTTP), or any other network communication means. Alternatively, cloud configuration client 110 may be implemented as a software/hardware module executing directly on cloud management server 120. In some embodiments, cloud configuration client 110 may be implemented using a VMware vSphere® client.

In some embodiments, a "cloud computing environment", or a "cloud", may be a network-based, computing architecture that provides shared pools of cloud resources on demand; and a "virtual machine cloud computing environment", or "VM cloud", may be a cloud computing environment implemented using some virtualized computing resources. Cloud 140 or cloud 180 may contain, among other components, one or more VMs and physical machines. Cloud management server 120 may be responsible for managing cloud 140 and/or cloud 180, and implementing various cloud functionalities such as resource pooling, resource allocating, high-availability, and automation etc. In some embodiments, Cloud management server 120 may be implemented using the VMware vRealize®, including but not limited to, VMware vRealize® Automation™ and VMware vRealize® Orchestrator™ (hereinafter "Orchestrator"). In some embodiments, cloud 140 may be constructed using VMware products such as the VMware vSphere® or VMware vCloud®. In some embodiments, cloud 180 may be constructed using one or more third-party products other than VMware products, such as Amazon® Web Services.

In some embodiments, cloud management server 120 may construct cloud 140 and/or cloud 180 by creating one or more VMs, in order to implement in cloud 140 and/or cloud 180 some cloud-based functionality, such as VM high-availability, VM load-balancing, VM resource distributions, etc. VMs may be created based on one or more physical machines having a "physical hardware platform" (e.g., an x86 architecture platform). The physical hardware platform may include various "physical hardware components" such as, without limitation, one or more physical Central Processing Units (CPUs), physical memory, physical storage (e.g., hard drive), physical Network Interface Card (NIC), and/or additional electronic circuit components (all of which are not shown in FIG. 1).

In some embodiments, the physical machines may include a "hypervisor" to construct a "virtual hardware platform" for the VMs based on the physical hardware platform. The virtual hardware platform of the VMs may be configured with one or more "virtual hardware components" such as, without limitation, one or more virtual CPUs, virtual memory, virtual storage, virtual NIC, and/or additional virtual components. The virtual hardware components may emulate the behaviors and the computing capabilities of the physical hardware components, thereby allowing the VMs to function as if they were physical machines. Further, cloud management server 120 may pool all the resources in the VMs together to form "virtual computing resources" in cloud 140 and/or cloud 180.

In some embodiments, cloud 140 may be used to implement one or more deployment environments 150 and 160 to deploy one or more virtual machines and/or virtual computing instances on one or more endpoints (e.g., endpoints 151 and 161) in one or more deployment environments 150 and 160. In some other embodiments, cloud 180 may be used to implement a deployment environment 170 to deploy one or more virtual machines and/or virtual computing instances on one or more endpoints (e.g., endpoint 171). More specifically, any endpoint may include hosts (e.g., hosts 173 at endpoint 171) and virtual machines (e.g., VMs 172 at endpoint 171) supported by the hosts.

A "deployment environment" may refer to a relatively independent/isolated environment having a set of physical machines and configurations. As depicted in FIG. 1, cloud management server 120 may configure multiple deployment environments 150, 160 and 170 in clouds 140 and 180. Cloud management server 120 may create and manage the various deployment environments in clouds 140 and 180 via Representational State Transfer (REST) Application Programming Interface (API) or any other client-server communication protocols. In some embodiments, a deployment environment may include one or more endpoints. For example, endpoints 151 and 161 may be VMware's endpoints, such as VMware vCenter Server®, VMware vCloud® Air™ OnDemand service and VMware vCloud Director Server®. For example, endpoint 171 may be a third-party endpoint other than VMware's endpoints, such as Amazon® S3 Cloud and Amazon® EC2 Cloud.

In some embodiments, cloud management server 120 may utilize cloud broker 141 to access and manage cloud 140, deployment environments 150, 160 and endpoints 151, 161. In some other embodiments, cloud management server 120 may utilize cloud broker 181 to access and manage cloud 180, deployment environment 170 and endpoint 171. A "cloud broker" may be an application or module tailored to a specific cloud, and configured to perform various tasks in view of the specific cloud's customized implementation and configurations. For example, cloud broker 141 may be configured to manage virtual machine and/or virtual computing instance deployment on endpoints 151 and 161, and cloud broker 181 may be configured to manage virtual machine and/or virtual computing instance deployment on endpoint 171.

In some embodiments, cloud brokers 141 and 181 may be implemented as a component or service of clouds 140 and 180, respectively. In other words, cloud brokers 141 and 181 may be operating within cloud 140's and cloud 180's environment, respectively. Alternatively, cloud brokers 141 and 181 may be implemented as an application or service external to clouds 140 and 180, respectively. In this case, cloud brokers 141 and 181 may be located at a third-party system, acting as a cloud service customer of cloud 140 and cloud 180, and may interact with cloud 140 and cloud 180 using network communications, respectively. In addition, cloud brokers 141 and 181 may also be installed as an internal component of cloud management server 120.

In some embodiments, a user may browse a common service catalog provided by cloud management server 120 at cloud configuration client 110. The common service catalog may include one or more catalog items. A catalog item may correspond to one or more published machine blueprints, one or more published XaaS blueprints and/or software components. The user may select one or more catalog items from the common service catalog and generate a client request associated with the selected catalog items.

In some embodiments, cloud management server 120 may receive (111) one or more client requests 113 corresponding to one or more catalog items of the common service catalog, requesting the deployment of one or more VMs and/or virtual computing instances in cloud 140 or cloud 180. In some embodiments, cloud management server 120 may implement a blueprint deployment approach to fulfill the client requests.

In some embodiments, topology generator 121 is configured to generate blueprints 123 based on one or more published machine blueprints, one or more published XaaS blueprints and/or software components. In some embodiments, topology generator 121 is configured to capture the hardware infrastructure that can support the virtual machines or virtual computing instances in clouds 140 and 180. Examples of the hardware infrastructure include application servers, database servers, monitoring services, web servers, messaging services, and other middleware services, as well as virtual computing resources that can be provisioned from clouds 140 and 180, respectively.

In some embodiments, a machine blueprint may determine the attributes of the machine, the manner in which it is provisioned, and its policy and management settings. An XaaS blueprint may refer to an Orchestrator workflow that can provision resources, make changes to provisioned resources, or behaves as a service that performs a task.

In some embodiments, in response to a client request 113 corresponding to one or more catalog items from cloud configuration client 110, cloud management server 120 may initiate a deployment process to deploy one or more virtual machines and/or virtual computing instances in clouds 140 and/or 180. Specifically, cloud management server 120 may invoke deployment plan generator 124 to construct deployment plans 126 based on blueprints 123.

In some embodiments, cloud management server 120 may utilize deployment director 127 to execute deployment plan 126. Deployment director 127 may communicate with cloud brokers 141 and/or 181 to access cloud computing environments 140 and/or 180 and select one or more endpoints (e.g., endpoints 151, 161 and 171) within clouds 140 and 180 to deploy one or more virtual machines and/or virtual computing instances according to deployment plan 126. In some embodiments, endpoints 151 and 161 may be different VMware vCenter Server® configured to manage various virtual machines supported by VMware vSphere® in deployment environments 150 and 160, respectively.

Day 2 operations may refer to one or more post provisioning operations. For example, day 2 operations may include routine maintenance tasks and changes to clouds 140 and 180. The day 2 operations may include scripts for replication management and virtual machine snapshot consolidation, password and certificate management, and diagnostic information. For a homogeneous cloud including cloud configuration client 110, cloud management server 120, and cloud 140, day 2 operations may be performed through the common service catalog. However, conventionally, day 2 operations cannot be performed through the common service catalog for a heterogeneous cloud including components from various vendors, such as cloud configuration client 110, cloud management server 120, and cloud 180, because these components may include different application programming interfaces.

More specifically, in conventional approach, one or more VMs 172 may be stopped, hibernated, or terminated through another cloud management server (not shown) other than cloud management server 120 after VMs 172 are provisioned. Therefore, cloud management server 120 will not be aware of the Day 2 changes of VMs 172, resulting failure to update resources in cloud 180 having been allocated to VMs 172 and to reallocate these occupied resources to other virtual machines or virtual computing instances in need.

In some embodiments, cloud management server 120 further includes day 2 dynamic types plug-in 128, catalog service 122, and optionally, scheduled data collection workflow 129 to facilitate using the common service catalog to manage day 2 operations in a heterogeneous cloud.

In some embodiments, day 2 dynamic types plug-in 128 is configured to define dynamic types, create objects of the defined dynamic types, and set relations between the objects. A definition of a dynamic type may include a description of one or more properties and a set of finder workflows and/or actions. A runtime instance of a dynamic type may refer to a dynamic object. The finder workflows and/or actions may be used to find the dynamic objects of this type.

More specifically, in some embodiments, day 2 dynamic types plug-in 128 may run Define Namespace (e.g., for VMs 172 which represents Amazon EC2 virtual computing instances in cloud 180) workflows and Define Type (e.g., for first Amazon EC2 virtual computing instance 174 among Amazon EC2 virtual computing instances 172 in cloud 180) workflows in Orchestrator inventory workflows and define first Amazon EC2 virtual computing instance 174 in cloud 180 with a dynamic type. Properties to describe first Amazon EC2 virtual computing instance 174 may include a Boolean flag property. In some embodiments, the Boolean flag property may indicate whether first Amazon EC2 virtual computing instance 174 still exists in cloud 180.

In response to running Define Namespace and Define Type workflows, day 2 dynamic types plug-in 128 may obtain a set of finder workflows. The obtained finder workflows may be stored as inventory workflows, which may then be further used to find a dynamic type representing first Amazon EC2 virtual computing instance 174 in cloud 180.

In some embodiments, a user may manually run the finder workflows from the Orchestrator inventory workflows to find first Amazon EC2 virtual computing instance 174 in cloud 180, for example. In response to first Amazon EC2 virtual computing instance 174 being not found within cloud 180, the Boolean flag property may be updated as "false," indicating first Amazon EC2 virtual computing instance 174 does not exist anymore. In response to first Amazon EC2 virtual computing instance 174 being found in cloud 180, the Boolean flag property may be updated as "true," indicating first Amazon EC2 virtual computing instance 174 still exists. Therefore, unlike the conventional approach, cloud management server 120 can obtain updated information associated with the Day 2 changes of one specific defined dynamic type (e.g., first Amazon EC2 virtual computing instance 174 in cloud 180) among defined dynamic types (e.g., VMs 172 in cloud 180).

In some other embodiments, scheduled data collection workflow 129 is configured to repeatedly run finder workflows for any defined dynamic type based on a predefined time interval and updates the Boolean flag property of the defined dynamic type as set forth above.

In some embodiments, scheduled data collection workflow 129 is also configured to call catalog service 122 to update existing catalog items or create new catalog item associated with any defined dynamic types according to its updated Boolean flag property. In some embodiments, in response to first Amazon EC2 virtual computing instance 174 being not found within cloud 180 by scheduled data collection workflow 129, schedule data collection workflow 129 is configured to request catalog service 122 and to create a "delete first EC2" catalog item in the common service catalog. In addition, schedule data collection workflow 129 is also configured to associate the "delete first EC2" catalog item with the blueprints 123 used to provision first Amazon EC2 virtual computing instance 174. In response, catalog service 122 may update the common service catalog to include the "delete first EC2" catalog item.

In response, a user who browses the updated common service catalog from cloud configuration client 110 will see the "delete first EC2" catalog item. In response to the user selects the "delete first EC2" catalog item, cloud configuration client 110 is configured to generate a request to delete first EC2 instance 174 to free up the resources in cloud 180 previously allocated for first Amazon EC2 virtual computing instance 174. Upon receipt of the request, cloud manager server 120 may retrieve blueprints 123 of first Amazon EC2 virtual computing instance 174 and generate one or more undeployment plans 126 through deployment plan generator 124. Deployment director 127 is configured to communicate with cloud broker 181 according to undeployment plans 126 to undeploy first Amazon EC2 virtual computing instance 174 from cloud 180 and free up resources in 180 previously being allocated to support first Amazon EC2 virtual computing instance 174.

Figure 2:
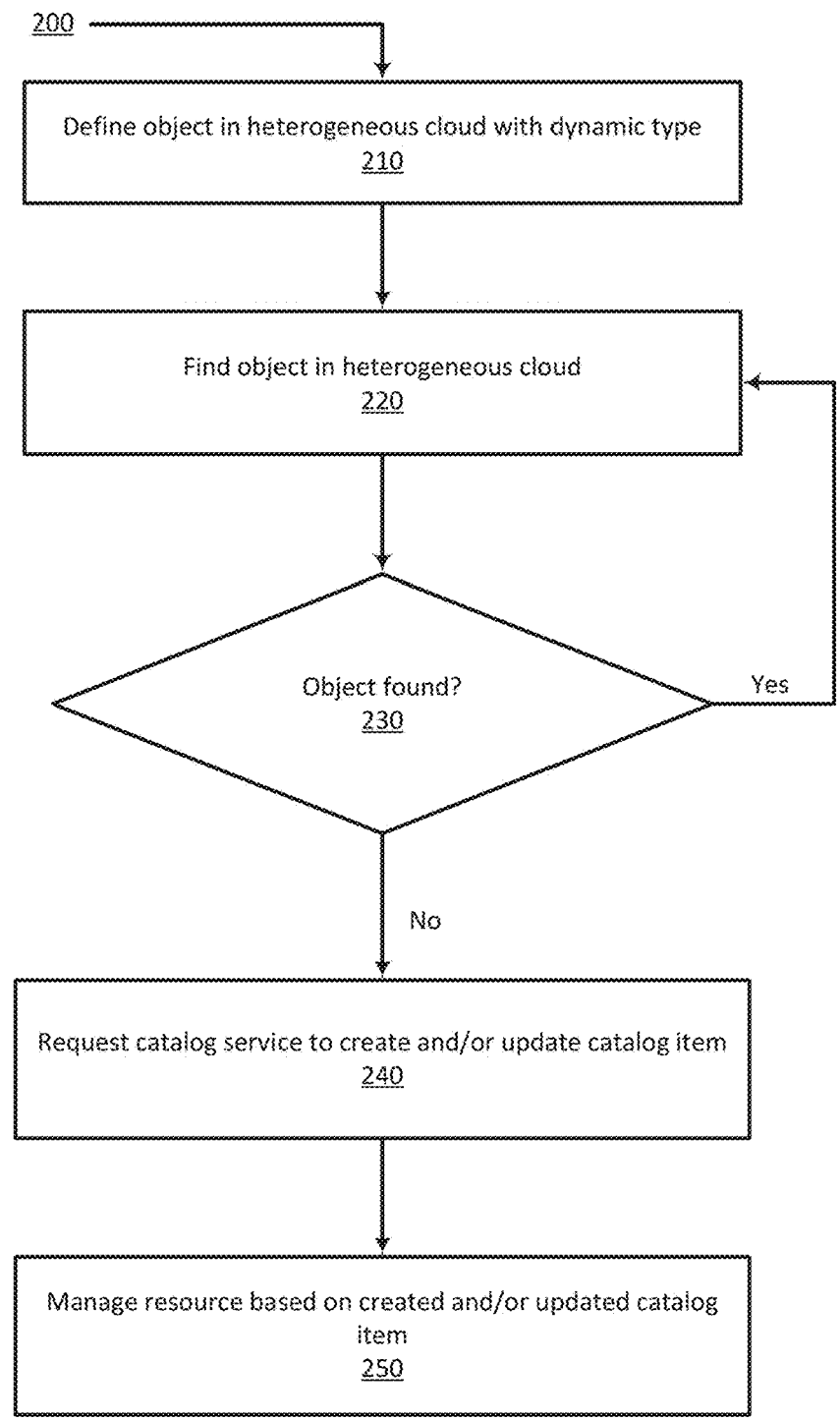
FIG. 2 shows a flow diagram illustrating a process to manage post provisioning operations in a heterogeneous cloud environment, according to one or more embodiments of the present disclosure.

FIG. 2 shows a flow diagram illustrating an example process 200 to manage post provisioning operations in a heterogeneous cloud environment, according to one or more embodiments of the present disclosure. Processes 200 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 2 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 210, a cloud management server is configured to define an object in a heterogeneous cloud. In some embodiments, the cloud management server may utilize a day 2 dynamic types plug-in to define the object with a dynamic type. More specifically, the dynamic types plug-in may run Define Namespace workflows and Define Type workflows from Orchestrator inventory workflows to define the object and its properties. In some embodiments, the properties include a Boolean flag property, indicating whether the object still exists in the heterogeneous cloud. In response, the dynamic types plug-in may obtain a set of finder workflows associated with the object. The obtained finder workflows may be then included as a part of Orchestrator inventory workflows to find the object in the heterogeneous cloud at a later time.

At block 220, the cloud management server is configured to find the object in the heterogeneous cloud. More specifically, the cloud management server may run the finder workflows from Orchestrator inventory workflows to find the object in the heterogeneous cloud. In response to the cloud management server finds the object in the heterogeneous cloud, the cloud management server is configured to update the Boolean flag property of the object as "true." In response to the cloud management server does not find the object in the heterogeneous cloud, the cloud management server is configured to update the Boolean flag property of the object as "false."

At block 230, in response to finding the object in the heterogeneous cloud, process 200 may loop back to block 220 in which the cloud management server will find the object in heterogeneous cloud again after a predefined time interval. In response to not finding the object in the heterogeneous cloud, process 200 goes block 240.

At block 240, the cloud management server requests a catalog service to create a "delete" catalog item in a common service catalog in the common service catalog. In addition, the cloud management server may associate the "delete" catalog item with one or more blueprints previously used to provision the object. The newly created "delete" catalog item may be provided to a user to select from the common service catalog. Alternatively, the cloud management server may request the catalog service to update one or more catalog item in the common service catalog. For example, if the object is not found because of being hibernated, a "hibernate" catalog item may be updated to a "wake up" catalog item. The updated "wake up" catalog item may be provided to a user to select from the common service catalog.

At block 250, in response to receiving a request based on a selection of the "delete" catalog item from the common service catalog, the cloud management server generates an undeployment plan based on the blueprints associated with the "delete" catalog item and previously used to provision the object. The undeployment plan is configured to undeploy the object. The cloud management server then communicates with a cloud broker associated with the object and carry out the undeployment plan to free up the resources in the heterogeneous cloud used to support the object. Alternatively, in response to receiving a request based on a selection of the "wake up" catalog item from the common service catalog, the cloud management server generates a deployment plan based on the blueprints used to provision the object. The cloud management server then communicates with a cloud broker associated with the object and carry out the deployment plan to allocate the resources in the heterogeneous cloud to support the object.

FIG. 3 illustrates a scripting example 300 associated with defining an object in a heterogeneous cloud environment according to a namespace, a type, a unique identification, and a name, according to one or more embodiments of the present disclosure. In some embodiments, vCACTest 301 is a sample plugin that includes objects. SPTString 302 refers to one object in vCACTest 301. In some embodiments, "vCACTest:SPTString" may refer to a type defined by Define Type workflows in Orchestrator inventory workflows and findALLForType("VCACTest:SPTString") may return all objects of the defined type.

In some embodiments, DynamicTypeManager.makeObject 310 is used to create a dynamic type object for each returned object of the defined type. The dynamic type object may be defined by idf 311, type 312, id 313, and "Object_"+ str.name 314.

In some embodiments, idf 311 refers to a namespace defined by Define Namespace workflows in Orchestrator inventory workflows of the namespace of the defined type. Type 312 may refer to the defined type. Id 313 may refer to a unique identification of each of the returned object. "Object_"+str.name 314 may correspond to a name of each of the returned object. Accordingly, a dynamic type object is created for each returned object of the defined type. Each of the dynamic type objects exists now and flagged true 321.

FIG. 4 illustrates a scripting example 400 associated with finder workflows, according to one or more embodiments of the present disclosure. In some embodiments, vCACTest, SPTString, and "vCACTest:SPTString" in FIG. 4 have the same definitions as vCACTest 301, SPTString 302, and "vCACTest:SPTString" in FIG. 3, respectively. In some embodiments, id 401 may refer to id 313 which is a unique identification of an object, and findForType("VCACTest: SPTString", id) may return the object having the unique identification. In response to finding the object in 410, the object is flagged true 411. In response to not finding the object in 420, the object is flagged false 421.

Thus, systems and methods for managing post provisioning operations in a heterogeneous cloud environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-ft or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method to manage post provisioning operations of a virtual computing instance in a heterogeneous cloud environment, the method comprising:
    defining the virtual computing instance, by a first management entity, with a dynamic type, wherein the virtual computing instance is configured to receive a command from a second management entity, wherein the dynamic type includes an updateable property indicating a status of the virtual computing instance in the heterogeneous cloud environment;
    finding, by the first management entity, the dynamic type in the heterogeneous cloud environment; and
    in response to not finding the dynamic type in the heterogeneous cloud environment:
        generating, by the first management entity, an undeployment plan or a deployment plan of the virtual computing instance based on one or more blueprints associated with a catalog item for the virtual computing instance.

2. The method of claim 1, wherein the one or more blueprints were used, by the first management entity, to provision the virtual computing instance in the heterogeneous cloud environment.

3. The method of claim 2, wherein the undeployment plan is generated in response to the virtual computing instance being terminated based on the command received from the second management entity.

4. The method of claim 3, further comprising carrying out the undeployment plan and freeing up resources previously allocated to provision the virtual computing instance based on the one or more blueprints.

5. The method of claim 2, wherein the deployment plan is generated in response to the virtual computing instance being hibernated based on the command received from the second management entity.

6. The method of claim 5, further comprising carrying out the deployment plan and allocating resources to provision the virtual computing instance based on the one or more blueprints.

7. A non-transitory computer-readable storage medium, containing a set of instructions which, in response to execution by a processor, cause the processor to perform a method to manage post provisioning operations of a virtual computing instance in a heterogeneous cloud environment, the method comprising:
    defining the virtual computing instance, by a first management entity, with a dynamic type, wherein the virtual computing instance is configured to receive a command from a second management entity, wherein the dynamic type includes an updateable property indicating a status of the virtual computing instance in the heterogeneous cloud environment;
    finding, by the first management entity, the dynamic type in the heterogeneous cloud environment; and
    in response to not finding the dynamic type in the heterogeneous cloud environment:
        generating, by the first management entity, an undeployment plan or a deployment plan of the virtual computing instance based on one or more blueprints associated with a catalog item for the virtual computing instance.

8. The non-transitory computer-readable storage medium of the claim 7, wherein the one or more blueprints were used, by the first management entity, to provision the virtual computing instance in the heterogeneous cloud environment.

9. The non-transitory computer-readable storage medium of the claim 7, wherein the undeployment plan is generated in response to the virtual computing instance being terminated based on the command received from the second management entity.

10. The non-transitory computer-readable storage medium of the claim 9, wherein the method further comprises carrying out the undeployment plan and freeing up resources previously allocated to provision the virtual computing instance based on the one or more blueprints.

11. The non-transitory computer-readable storage medium of the claim 7, wherein the deployment plan is generated in response to the virtual computing instance being hibernated based on the command received from the second management entity.

12. The non-transitory computer-readable storage medium of the claim 11, wherein the method further comprises carrying out the deployment plan and allocating resources to provision the virtual computing instance based on the one or more blueprints.

13. A system to manage post provisioning operations of a virtual computing instance in a heterogeneous cloud environment, the system comprising:
    a cloud management server configured to:
        define the virtual computing instance with a dynamic type, wherein the virtual computing instance is configured to receive a command from another management entity, wherein the dynamic type includes an updateable property indicating a status of the virtual computing instance in the heterogeneous cloud environment;
        find the dynamic type in the heterogeneous cloud environment; and
        in response to not finding the dynamic type within the heterogeneous cloud environment:
        generate an undeployment plan or a deployment plan of the virtual computing instance based on one or more blueprints associated with a catalog item for the virtual computing instance.

14. The system of claim 13, wherein the one or more blueprints were used, by the cloud management server, to provision the virtual computing instance in the heterogeneous cloud environment.

15. The system of claim 13, wherein the undeployment plan is generated in response to the virtual computing instance being terminated based on the command received from the another management entity.

16. The system of claim 15, wherein the cloud management server is further configured to carry out the undeployment plan and free up resources previously allocated to provision the virtual computing instance based on the one or more blueprints.

17. The system of claim 13, wherein the deployment plan is generated in response to the virtual computing instance being hibernated based on the command received from the another management entity.

18. The system of claim 17, wherein the cloud management server is further configured to carry out the deployment plan and allocate resources to provision the virtual computing instance based on the one or more blueprints.

* * * * *